(12) United States Patent
Sprenger et al.

(10) Patent No.: US 12,291,131 B2
(45) Date of Patent: May 6, 2025

(54) SEAT FORE-AND-AFT ADJUSTER FOR A SEAT, PARTICULARLY A VEHICLE SEAT AND VEHICLE SEAT

(71) Applicant: ADIENT US LLC, Plymouth, MI (US)

(72) Inventors: Erik Sprenger, Wermelskirchen (DE); Andrej Sulak, Podluzany (SK)

(*) Notice: Subject to any disclaimer, the term of this patent is extended or adjusted under 35 U.S.C. 154(b) by 345 days.

(21) Appl. No.: 17/797,160

(22) PCT Filed: Feb. 5, 2021

(86) PCT No.: PCT/EP2021/052755
§ 371 (c)(1),
(2) Date: Aug. 3, 2022

(87) PCT Pub. No.: WO2021/160528
PCT Pub. Date: Aug. 19, 2021

(65) Prior Publication Data
US 2023/0049188 A1 Feb. 16, 2023

(30) Foreign Application Priority Data

Feb. 10, 2020 (DE) .................... 10 2020 201 620.8
May 13, 2020 (DE) .................... 10 2020 112 907.6

(51) Int. Cl.
*B60N 2/06* (2006.01)
*B60N 2/02* (2006.01)
*B60N 2/07* (2006.01)

(52) U.S. Cl.
CPC ........... *B60N 2/067* (2013.01); *B60N 2/0705* (2013.01); *B60N 2/02253* (2023.08)

(58) Field of Classification Search
CPC . B60N 2/067; B60N 2/02253; B60N 2/02258
See application file for complete search history.

(56) References Cited

U.S. PATENT DOCUMENTS

2008/0197654 A1  8/2008  Livesey et al.
2008/0238126 A1  10/2008  Koga et al.
(Continued)

FOREIGN PATENT DOCUMENTS

CN      105564276 A     5/2016
DE   102014211749 A1   12/2014
(Continued)

OTHER PUBLICATIONS

PCT International Search Report and Written Opinion (PCT/EP2021/052755).

*Primary Examiner* — David R Dunn
*Assistant Examiner* — Tania Abraham
(74) *Attorney, Agent, or Firm* — Marshall & Melhorn, LLC

(57) ABSTRACT

A seat fore-and-aft adjuster for a vehicle seat may have a lower rail and an upper rail. The adjuster may also have a drive unit, a gearbox unit having a gearbox housing, and a cover element. The upper rail may have at least one through-hole. The cover element may have at least one covering region, which is formed from two cover legs opposite to and parallel with one another. The cover element may have at least one covering sub-region arranged laterally to the covering region. The covering sub-region is defined by a covering wing protruding vertically in the longitudinal direction from one of the cover legs. The covering region is frictionally and/or interlockingly connected to the housing section, and the covering sub-region covers at least one connecting region of the bracket above that of the upper rail by the covering wing.

14 Claims, 5 Drawing Sheets

(56) References Cited

U.S. PATENT DOCUMENTS

2015/0090856 A1    4/2015  Morishita et al.
2019/0210488 A1*   7/2019  Fujita .................... B60N 2/067

FOREIGN PATENT DOCUMENTS

| FR | 2928880 A1    | 9/2009 |
| FR | 3001667 A1    | 8/2014 |
| WO | 2010039968 A1 | 4/2010 |

* cited by examiner

SEAT FORE-AND-AFT ADJUSTER FOR A SEAT, PARTICULARLY A VEHICLE SEAT AND VEHICLE SEAT

FIELD

The invention relates to a longitudinal seat adjuster for a seat, in particular a vehicle seat. The invention further relates to a vehicle seat.

BACKGROUND

There are known from the prior art longitudinal seat adjusters in which a transmission is arranged in a transmission housing and is coupled to a seat rail of the longitudinal seat adjuster.

There are known from the prior art transverse carriers which are arranged between rail pairs of longitudinal seat adjusters.

There are further known from the prior art covers for rails, such as end caps, and covers for transmission units of longitudinally displaceable vehicle seats. The covers prevent foreign bodies from being introduced into the rails and ensure that sharp edges of the rails are covered. Known covers for transmission units are secured in the prior art to a transverse carrier and are screwed to an upper rail of a rail pair.

FR 2 928 880 A1 discloses an adjustment apparatus for a vehicle seat, having a first adjustable subassembly, a second adjustable subassembly and having an electric motor, wherein the electric motor is operationally connected both to an adjustment transmission of the first adjustable subassembly and to an adjustment transmission of the second adjustable subassembly by two output shafts, wherein there is provided a motor carrier which receives the electric motor. The motor carrier is produced in one piece from plastics material and has at each of the two ends thereof an adapter which is integrated in the motor carrier for fixing the motor carrier to the two adjustable subassemblies. A similar adjustment apparatus for a vehicle seat is known from FR 3 001 667 A1.

SUMMARY

An object of the present invention is to provide a longitudinal seat adjuster which is improved over the prior art and to provide a vehicle seat having an improved longitudinal seat adjuster.

The object is achieved according to the invention by a longitudinal seat adjuster for a seat, in particular a vehicle seat, which comprises at least one rail pair having a lower rail and an upper rail which is displaceably supported on the lower rail, a drive unit and a transmission unit having a transmission housing, wherein the transmission unit and the drive unit are coupled to each other. Furthermore, the longitudinal seat adjuster comprises at least one holder for fixing the transmission housing to the upper rail and a covering element at least for covering the transmission housing. The upper rail has at least one through-opening, through which at least one housing portion of the transmission housing projects. The covering element comprises at least one covering region which is formed by two covering legs which are opposite each other in a parallel manner and the covering element comprises at least one covering part-region which is laterally arranged with respect to the covering region, wherein the covering part-region is defined by a covering wing which projects perpendicularly in the longitudinal direction from one of the covering legs. The covering region is connected to the housing portion in a non-positive-locking and/or positive-locking manner and the covering part-region covers at least one connection region of the holder above the upper rail by the covering wing.

The advantages obtained with the invention are particularly that, as a result of the covering region, the transmission unit is covered in a simple and rapid manner, wherein the use of additional separate connection elements, such as screws, rivets or bolts, and welding connection or soldering connections is avoided by the positive-locking and/or non-positive-locking connection of the covering region to the transmission unit. The cover can be produced in a cost-effective manner to the greatest possible extent. Furthermore, the cover provides a weight-saving solution, wherein, for example, a rail pair, in particular an upper rail, is not loaded with additional weights of connection elements. In particular, the transmission unit and the holder and/or at least one fixing region, in particular connection region, of the holder to the upper rail are protected from external influences, such as dirt, dust or water, which can damage the transmission unit and the fixing region.

Furthermore, a position of the covering element on the transmission unit or on the transmission housing is secured in a simple and effective manner. The covering element is preferably fixed directly to the housing portion. For example, the covering element is arranged with spacing from the upper rail as a result of the transmission housing. Additional fixing elements, such as screws, are unnecessary in order to fix the covering element to the upper rail in the region of the transmission unit. Furthermore, both the transmission housing and the through-opening and, consequently, an inner rail space below are covered and protected by the covering element.

In one possible embodiment, the covering part-region covers, for example, at least one connection element of the holder in order to fix the holder to the upper rail. The connection element is, for example, a fixing element, such as a screw element, rivet element or welding element or soldering element. A head of the connection element is preferably arranged at an upper side of the upper rail. By the covering part-region of the covering element, a connection head arranged in such a manner is covered and protected from external influences. The covering part-region and the covering region may comprise overlapping regions. The covering element is therefore constructed to cover both the transmission housing and the holder without using a separate additional cover and without additional fixing elements.

In one possible embodiment, the covering element comprises at least one covering wing which projects laterally from the covering region and which covers at least one connection region of the holder with respect to the upper rail. The covering wing defines, for example, the covering part-region. The covering wing is arranged on the covering region in such a manner that the covering wing is arranged with spacing from the upper side of the upper rail when the covering element is in the state mounted on the transmission unit. Therefore, the covering part-region is formed substantially under the covering wing. The covering wing is, for example, in the form of a screen element. The covering element is connected to the transmission unit only via the covering region and consequently secured to the upper rail. The covering wing does not additionally have to be fixed to the upper rail.

At each lateral side of the covering region, a covering wing and a covering part-region may be provided. For example, the holder is a caliper holder. For example, the holder is substantially U-shaped or C-shaped, wherein an open region is directed upward, that is to say, in the direction of the upper rail. Retention legs of the holder surround the transmission housing, wherein open ends of the retention legs are each secured to the upper rail. For example, the retention legs are secured to the upper rail by fixing elements, such as screws, and/or integrated connection elements, wherein the fixing elements and/or connection elements are guided through an upper side of the upper rail. In this instance, a head of the respective fixing element and/or connection element is arranged at the upper side and must be protected from external influences in order to ensure a fixing force. The covering wings are arranged above these fixing elements and/or connection elements and enclose the fixing elements and/or connection elements in the covering part-regions thereof.

In one possible embodiment, the covering element comprises at least one covering web and two covering legs which project from the covering web and which are opposite each other in a parallel manner, wherein an empty space which is present between the covering legs forms the at least one covering region. The covering web and the covering legs form, for example, a base member, in particular a covering portion, of the covering element. The base member or covering portion is, for example, substantially U-shaped or C-shaped. In this instance, an open end is directed downwardly, that is to say, in the direction of the upper rail. A covering wing projects from one of the covering legs. For example, the covering wing projects from the covering leg substantially perpendicularly or at a predetermined angle. The covering wing is substantially L-shaped or J-shaped, wherein one end of the covering wing is connected to the covering leg. In a development, the covering element is constructed in one piece. For example, the covering leg and covering wing are constructed in one piece.

In one possible embodiment, the covering region has at least one form corresponding to a form of the housing portion of the transmission unit.

In one possible embodiment, the covering element is substantially omega-shaped. For example, the covering region is omega-shaped, wherein the housing portion is arranged in the open receiving region of the omega shape.

In one possible embodiment, the respective covering leg comprises at least one bulbous portion which is directed inwardly into the covering region for non-positive-locking and/or positive-locking connection to the housing portion. The housing portion has in this case a form which corresponds to the respective bulbous portion, in particular a recess.

In one possible embodiment, the holder is arranged with the transmission housing in an inner space which is formed by the rail pair and is fixed to the upper rail thereof.

In one possible embodiment, the holder comprises at least one connection element which projects through a through-opening which is formed in the upper rail and which fixes the holder to the upper rail. The holder comprises, for example, a retention web and at least two retention legs which project from the retention web and which are opposite each other in a parallel manner. An empty space present between the retention legs forms a receiving region, for example, in the form of a receiving tank, for receiving the transmission unit, wherein the retention legs each have at one of the ends thereof a plastically deformable connection element, which connection elements are plastically deformed when the longitudinal seat adjuster is in the state mounted on the upper rail in such a manner that the connection elements are connected to an upper side of the upper rail in a non-positive-locking and/or positive-locking manner.

In one possible embodiment, the covering element is connected to a transverse carrier for retaining the drive unit on the rail pair. For example, the longitudinal seat adjuster comprises two rail pairs which are connected to each other via the transverse carrier. The transverse carrier is a motor retention leg. Displacement movements of the upper rails relative to each other are thereby synchronized. A carrier member of the transverse carrier has two ends, wherein one end is coupled to a rail pair of the longitudinal seat adjuster. At least at one of these ends, the covering unit is arranged and connected to a transmission unit of one of the rail pairs in a non-positive-locking and/or positive-locking manner. For example, the covering element is fixed at one end of the carrier member, for example, welded, bonded or soldered.

The carrier member and the covering element can be constructed as a one-piece carrier element. Consequently, additional separate fixing elements, such as screws, for fixing the transverse carrier to one rail pair or to both rail pairs can be prevented. The carrier member and the covering element do not have to be connected to each other in an additional assembly step but instead are already produced in one piece. Conventional transverse carriers are screwed to the upper rail. The covering element allows connection of the transverse carrier without additional fixing elements, such as screws, wherein particularly the longitudinal seat adjuster is configured with reduced components and reduced weight, and consequently with reduced costs. Using the covering element, the transverse carrier is fixed to the transmission unit in a releasable manner, in particular in a non-positive-locking and/or positive-locking manner. The covering region is fitted or pushed onto the housing portion of the transmission unit or the housing portion of the transmission unit is inserted into the covering region. An additional cover for the connection regions of the holder on the upper rail is formed by the covering wings on the covering legs.

The cover may comprise at least one covering element with a transverse carrier connection portion and a covering portion. The covering portion may comprise at least two covering legs which are opposite each other in a parallel manner, wherein an empty space present between the covering legs forms a covering region, in particular a covering region and receiving region. The covering portion may be substantially U-shaped or C-shaped. The covering portion may have a downwardly open covering region, for example, in the form of a receiving tank. The covering portion may be constructed to completely cover a transmission unit of the longitudinal seat adjuster and/or to at least partially receive it. Furthermore, the covering region can be constructed to be able to be fixed to the transmission unit in a non-positive-locking and/or positive-locking manner.

In one embodiment, the covering portion is constructed to be particularly substantially omega-shaped (Ω-shaped) in cross section. A bulbous region, in particular a central region, of the covering portion is constructed to at least partially receive the transmission unit. For example, the transmission unit is fixed in the covering portion at least relative to longitudinal displacement by a positive-locking connection and/or non-positive-locking connection.

In a development, the covering portion comprises covering wings, for example, covering straps or covering flaps. The covering legs have covering wings which project perpendicularly therefrom, wherein the covering wings are constructed to cover a fixing apparatus of the transmission unit. The covering wings are substantially L-shaped or J-shaped and form together with the covering legs the downwardly open covering region. For example, the transmission unit is fixed to an upper rail of the longitudinal seat adjuster by a fixing apparatus, in particular in the form of a U-shaped or C-shaped retention caliper. The fixing apparatus comprises a holder having at least two retention legs which are opposite each other in a parallel manner. An empty space present between the retention legs forms a receiving region, for example, in the form of a receiving tank, for receiving the transmission unit, wherein the retention legs each have a plastically deformable connection element at one of the ends thereof which are plastically deformed when the longitudinal seat adjuster is in the state mounted on the upper rail in such a manner that the connection elements are connected to an upper side of the upper rail in a non-positive-locking and/or positive-locking manner. In an alternative variant, the retention legs are screwed or welded at one of the ends thereof to the upper side of the upper rail. The connections arranged at the upper side of the upper rail can be covered in a simple and rapid manner by the covering wings.

For example, the covering legs and the covering wings are constructed in one piece. For example, the covering portion and the transverse carrier connection portion are constructed in one piece. The cover is made, for example, from metal and/or plastics material. For example, the cover is an injection-molded part.

The transverse carrier may comprise at least one carrier member and a cover which is arranged on the carrier member. The carrier member has two ends, wherein one end is coupled to a rail pair of the longitudinal seat adjuster. At least at one of these ends, the cover is arranged and connected to a transmission unit of the rail pair in a non-positive-locking and/or positive-locking manner. For example, the cover is fixed at one end of the carrier member, for example, welded, bonded or soldered. In particular, the carrier member and the cover are constructed as a one-piece carrier element. For example, the carrier member is made from metal and/or plastics material. For example, the carrier member and the cover can be produced with a casting method.

The longitudinal seat adjuster may comprise two rail pairs and at least one transverse carrier which connects the two rail pairs to each other. The rail pairs extend parallel with each other and are arranged with spacing from each other under the vehicle seat. The transverse carrier is provided to connect the rail pairs to each other so as to be coupled in terms of movement.

Furthermore, the object is achieved by a vehicle seat having a longitudinal seat adjuster described above.

BRIEF DESCRIPTION OF THE FIGURES

An embodiment of the invention is explained in greater detail below with reference to drawings, in which.

Mutually corresponding members are referred to in all the Figures with the same reference numerals.

DETAILED DESCRIPTION

Figure 1:
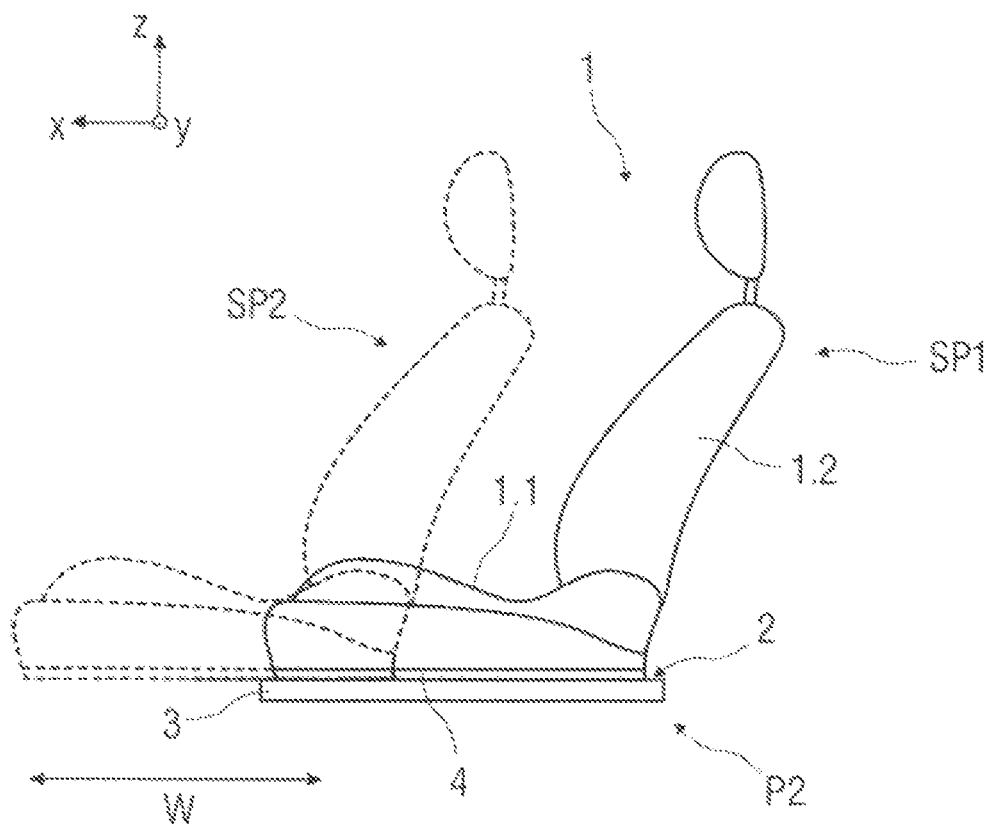
FIG. 1 schematically shows a side view of a vehicle seat with a longitudinal seat adjuster, FIG. 2 schematically shows a plan view of a longitudinal seat adjuster with two rail pairs.

FIG. 1 schematically shows a side view of a vehicle seat 1 with a longitudinal seat adjuster 2.

An arrangement of the vehicle seat 1 in the vehicle is defined with reference to the coordinate system used below, comprising a vertical axis z which is associated with a vertical direction of the vehicle, a longitudinal axis x which is associated with a longitudinal direction of the vehicle and a transverse axis y associated with a transverse direction of the vehicle.

The position indications and direction indications used, such as, for example, front, rear, top and bottom and above and below, relate to a viewing direction of a passenger who is sitting in the vehicle seat 1 in a normal sitting position, wherein the vehicle seat 1, in a state fitted in the vehicle, is orientated as conventional in the travel direction in a position for use suitable for conveying persons with an upright backrest 1.2. However, the vehicle seat 1 according to the invention may also be installed in a different orientation, for example, transversely relative to the travel direction.

The vehicle seat 1 comprises at least one seat face 1.1 and one backrest 1.2. The backrest 1.2 is connected, for example, to the seat face 1.1 and/or arranged in a movable manner relative to the seat face 1.1. For example, the vehicle seat 1 comprises a function with which the seat face 1.1 and the backrest 1.2 can together be displaced along a displacement path W between at least two positions SP1 and SP2. Furthermore, the vehicle seat 1 can be locked in any position along the displacement path W.

For longitudinal adjustment of the vehicle seat 1, it comprises at least one longitudinal seat adjuster 2. The position SP1 is, for example, a position for use and comfort position of the vehicle seat 1. The position SP2 is, for example, an entry position of the vehicle seat 1, wherein access to a region formed behind the vehicle seat 1 is increased.

Figure 2:
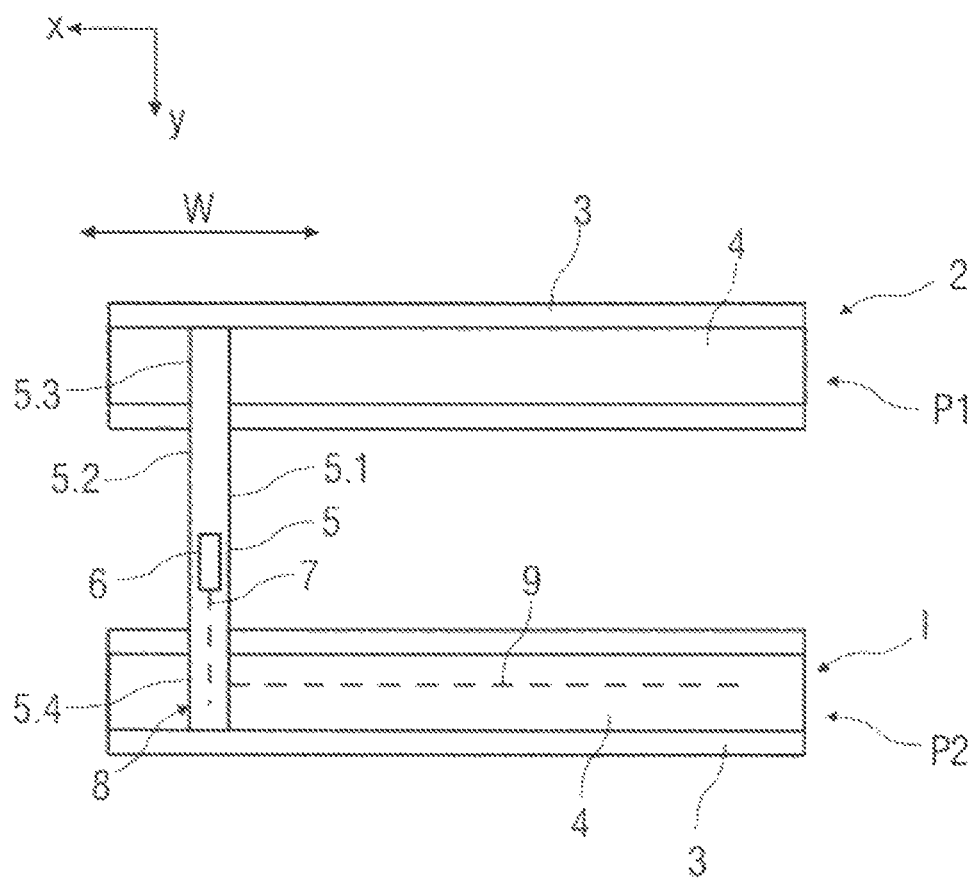

The longitudinal seat adjuster 2 comprises, for example, two rail pairs P1 and P2, as shown in FIG. 2 in greater detail, wherein in FIG. 1 only one of the rail pairs P1, P2 is illustrated. The respective rail pair P1, P2 comprises a lower rail 3 and an upper rail 4 which is movably arranged in the longitudinal direction on the lower rail 3.

FIG. 2 schematically shows a plan view of a longitudinal seat adjuster 2 with two rail pairs P1 and P2. The respective rail pair P1, P2 comprises a lower rail 3 and an upper rail 4 which is movably arranged in the longitudinal direction on the lower rail 3.

In this case, the lower rail 3 is arranged on a vehicle structure in a manner fixed to a vehicle, for example, on a vehicle floor. The upper rail 4 is arranged on the seat face 1.1, in particular under the seat face 1.1, and in particular securely connected thereto by a seat member structure.

Preferably, the rail pairs P1 and P2 are arranged at each side of the seat face 1.1, for example, beside each other in a transverse direction, and connected thereto. The rail pairs P1 and P2 are coupled to each other via a transverse carrier 5, for example, in the form of a transverse connection rod and/or a motor bridge. The transverse carrier 5 is provided to carry out a uniform longitudinal adjustment of the vehicle seat 1 if at least one of the rail pairs P1, P2 is actuated for longitudinal adjustment.

Furthermore, the transverse carrier 5 has a receiving member 5.1, in which at least one drive unit 6, for example, in the form of a motor, and a drive shaft 7 which is coupled to the drive unit 6 are arranged. For example, the transverse carrier 5 comprises a carrier member 5.2 which comprises the receiving member 5.1. In particular, the transverse carrier 5 is connected to the respective upper rail 4. The transverse carrier 5 is provided to retain the rail pairs P1, P2 so as to be coupled to each other in terms of movement. For example, the carrier member 5.2 has two ends 5.3, 5.4, wherein one end 5.3, 5.4 is connected to an upper rail 4, respectively.

If the drive unit 6 is operated, the drive shaft 7 is rotated and a longitudinal adjustment of the vehicle seat 1 is actuated. For example, the dive shaft 7 is coupled at least to a transmission unit 8 which is arranged on the rail pair P1 and/or P2. The transmission unit 8 is secured to the upper rail 4. For example, the transverse carrier 5 comprises an interface, which is arranged at least at one of the ends 5.3, 5.4 thereof, with respect to the transmission unit 8 in order, for example, to orientate cable connections and the drive shaft 7 relative to the transmission unit 8.

Furthermore, the transmission unit 8 is coupled to a threaded spindle 9. The transmission unit 8 is constructed to transmit a rotational movement of the drive shaft 7 to the threaded spindle 9, whereby the upper rail 4 is moved relative to the lower rail 3. To this end, the threaded spindle 9 is arranged in an inner space I formed between the lower rail 3 and the upper rail 4 and retained on the upper rail 4 in a rotationally movable manner. The lower rail 3 and the upper rail 4 engage mutually around each other with the substantially U-shaped profiles thereof with inwardly or outwardly bent edge regions.

For example, the threaded spindle 9 is coupled at one of the ends thereof to the transmission unit 8 and secured to the upper rail 4 in a rotationally movable manner at the other end, for example, by a retention apparatus which is not illustrated in greater detail, for example, in the form of a flange.

A spindle nut, which is not illustrated in greater detail and which is, for example, in the form of a block or a bush and through which the threaded spindle 9 is guided and with which the threaded spindle 9 is engaged, is screwed onto the threaded spindle 9. The spindle nut is securely retained on the lower rail 3. During rotation of the threaded spindle 9, it is screwed by the spindle nut and thereby moves relative to the lower rail 3. During the longitudinal adjustment of the vehicle seat 1, the upper rail 4 is moved relative to the lower rail 3.

Figure 3:
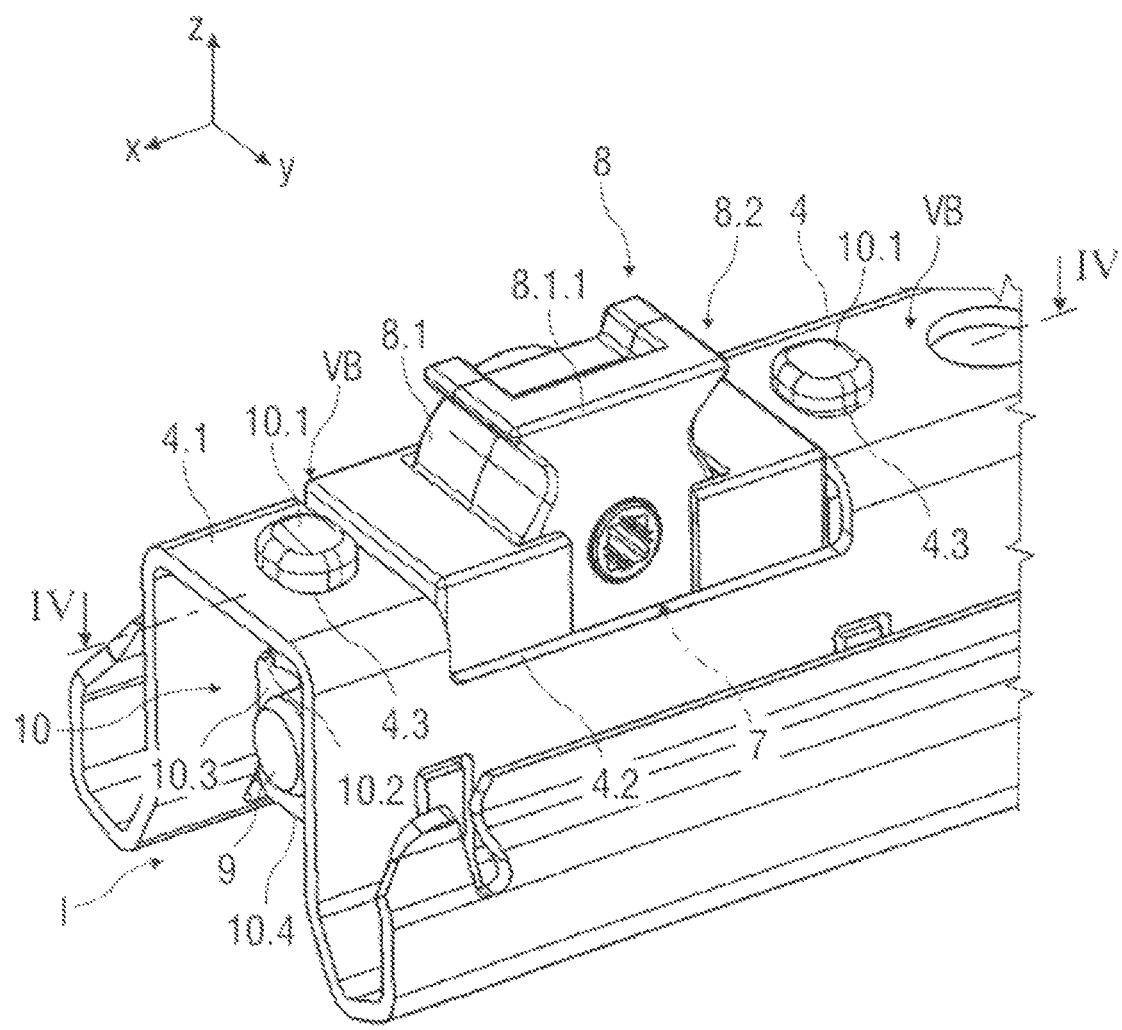
FIG. 3 shows a schematic, perspective view of an upper rail of a rail pair having a transmission unit secured thereto.

FIG. 3 shows a schematic, perspective view of an upper rail 4 of a rail pair P2 with a transmission unit 8 secured thereto.

The transmission unit 8 comprises a transmission housing 8.1 and a transmission mechanism 8.2 arranged in the transmission housing 8.1 for driving the threaded spindle 9 and consequently for longitudinally adjusting the vehicle seat 1. For example, the transmission mechanism 8.2 comprises a number of transmission elements which are coupled to each other in terms of movement, wherein the transmission mechanism 8.2 is connected to the drive unit 6 via the drive shaft 7. The transmission mechanism 8.2 is formed by a number or plurality of transmission elements. The transmission elements comprise, for example, a worm wheel, bearing disks, etc.

In this instance, the transmission unit 8, in particular the transmission housing 8.1, is secured to the upper rail 4. In order to fix the transmission unit 8 to the upper rail 4, a fixing apparatus 10 is provided. The fixing apparatus 10 is arranged in the manner of the transmission unit 8 in the inner space I of the rail pair P2. In particular, the transmission unit 8 is fixed to an upper side 4.1 of the substantially downwardly open U-shaped upper rail 4 by the fixing apparatus 10. The fixing apparatus 10 is substantially U-shaped. The fixing apparatus 10 comprises a substantially U-shaped or C-shaped holder 10.2. The holder 10.2 has two retention legs 10.3 which are opposite each other in a parallel manner. The retention legs 10.3 form together with the retention web 10.4 a receiving tank for receiving the transmission housing 8.1. The retention legs 10.3 are connected at open ends to the upper rail 4, for example, by separate fixing elements, such as screws. For example, the retention legs 10.3 each have at the open end thereof a plastically deformable connection element 10.1 for connecting, particularly fixing, the holder 10.2 to the upper rail 4, in particular to the upper side 4.1. The connection elements 10.1 are guided through the through-openings 4.3 in the mounted state and plastically deformed at the upper side 4.1. For example, the connection elements 10.1 are rivet elements. Alternatively, separate fixing elements which fix the retention legs 10.3 at the upper side 4.1 through the through-openings 4.3 are arranged on the upper side 4.1.

The upper rail 4 comprises, particularly at the upper side 4.1, a through-opening 4.2, through which the transmission housing 8.1 carried in the fixing apparatus 10 partially extends in order to couple the drive shaft 7. In this case, the transmission housing 8.1 comprises a housing portion 8.1.1 which projects upward through the through-opening 4.2. The housing portion 8.1.1 surrounds, for example, a portion of the transmission mechanism 8.2 which becomes or is coupled to the drive shaft 7. For example, a worm wheel is arranged in the region of the housing portion 8.1.1 and has to be at least partially exposed for connection to the drive shaft 7 in the upper rail 4. The upper rail 4, in particular the upper side 4.1, further comprises two additional through-openings 4.3, through which connection elements 10.1 of the fixing apparatus 10 are guided upwardly and locked, in particular riveted, at the upper side 4.1 of the upper rail 4. For example, the connection elements 10.1, such as rivet elements, are liable to corrosion and must be protected from external influences.

Figure 4A:
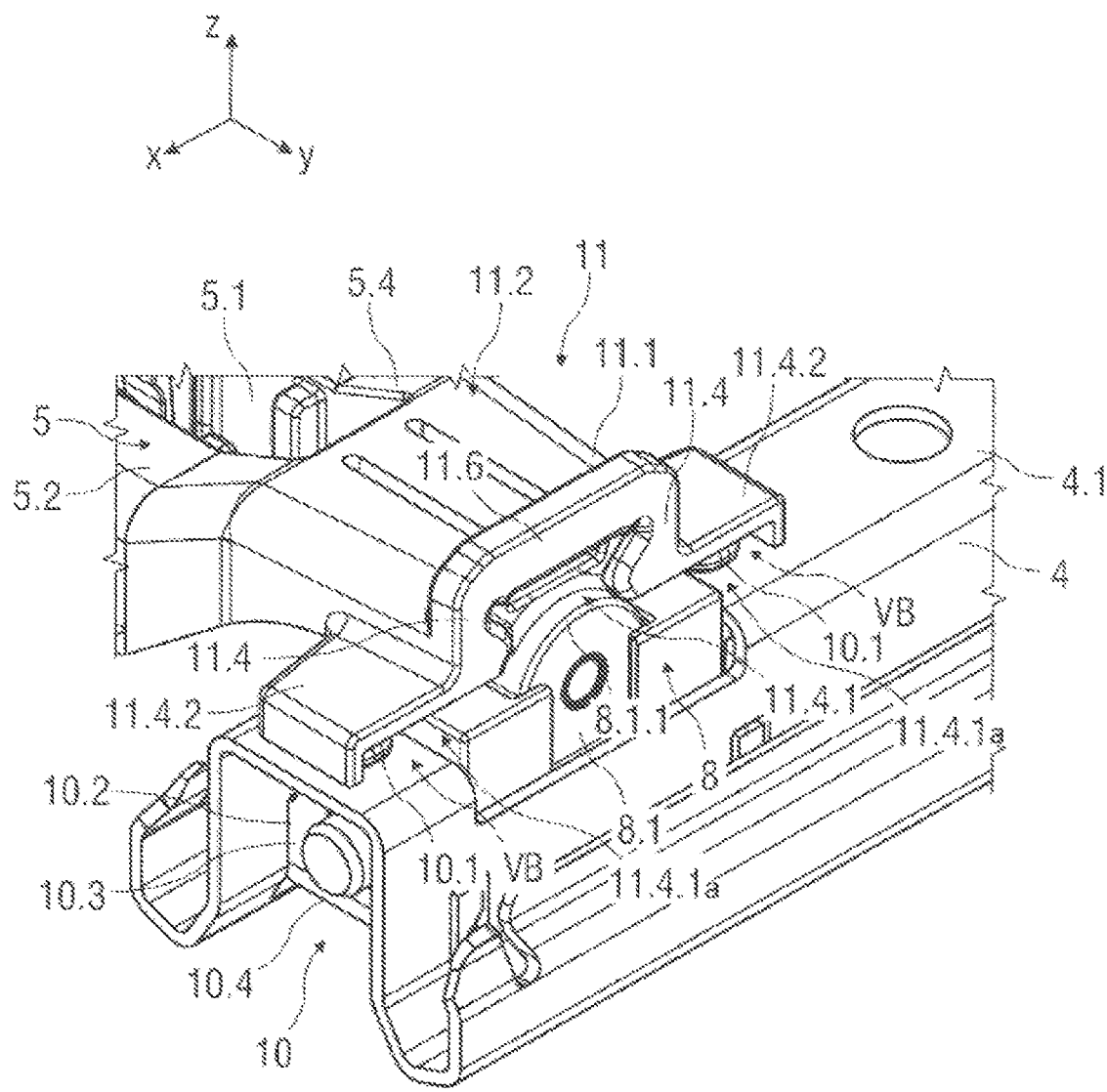
FIG. 4A shows a cut-out of a perspective view of the upper rail, the transmission unit and a cover of a transverse carrier which connects the rail pairs to each other, wherein the cover is provided to cover a transmission unit secured to an upper rail.
Figure 4B:
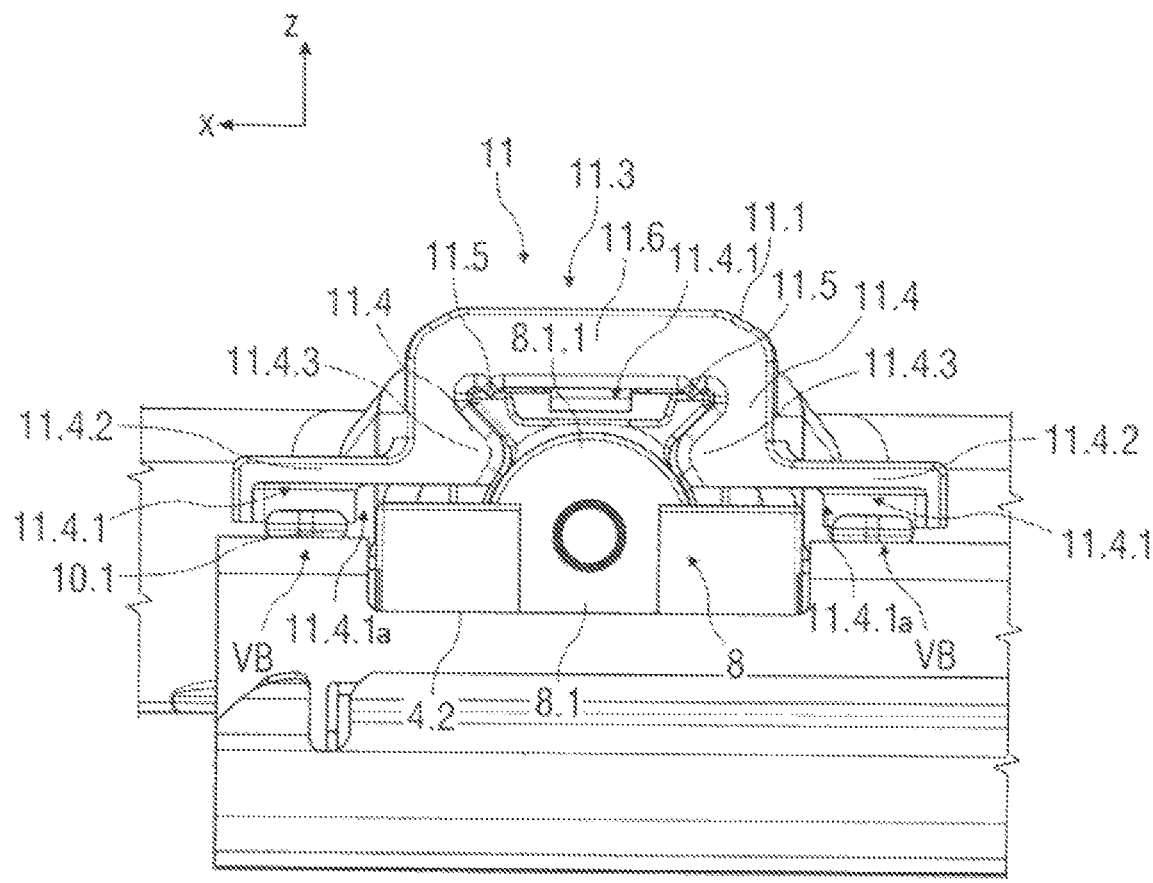
FIG. 4B shows a side view corresponding to FIG. 4A.

In order to protect the transmission unit 8 and fixing regions, in particular connection regions VB, of the fixing apparatus 10, in particular the holder 10.2, from external influences, a cover 11 which is shown in FIGS. 4A and 4B is provided in the region of the transmission unit 8. In particular, the cover 11 covers the through-openings 4.2 and 4.3. The cover 11 is arranged above the upper side 4.1 of the upper rail 4. In particular, the cover 11 is an integrated component of the transverse carrier 5.

FIGS. 4A and 4B schematically show a perspective view and a side view of the transverse carrier 5 with the cover 11, wherein the cover 11 is provided to cover the transmission unit 8 which is fixed to the upper rail 4 and the fixing apparatus 10 which fixes the transmission unit 8 to the upper rail 4. Furthermore, the cover 11 is provided to connect the transverse carrier 5 to the upper rail 4 and to orientate it relative thereto. In the prior art, the transverse carrier 5 is screwed to the upper rail 4. The illustrated embodiment provides a simple variant with reduced parts for connecting the transverse carrier 5 and the upper rail 4, in particular in the region of the transmission unit 8 and for protecting the region of the transmission unit 8.

The transverse carrier 5 is arranged and configured as a transverse connection rod and/or motor bridge between two rail pairs P1 and P2 to connect both rail pairs P1, P2 to each other. The transverse carrier 5 comprises at least the carrier member 5.2 and the cover 11 arranged thereon. The carrier member 5.2 has two ends 5.3, 5.4 (wherein only one end 5.4 is shown), wherein one end 5.3, 5.4 is coupled to one of the rail pairs P1, P2 of the longitudinal seat adjuster 2. The cover 11 is arranged at least at one of these ends 5.4 and connected to the transmission unit 8 in a positive-locking and/or non-positive-locking manner. For example, the cover 11 is fixed at one end 5.4 of the carrier member 5.2, for example, welded, bonded or soldered. Alternatively, the carrier member 5.2 and the cover 11 are formed as a one-piece carrier element. For example, the carrier member 5.2 is made from metal and/or plastics material.

The cover 11 comprises a covering element 11.1 with a transverse carrier connection portion 11.2 and a covering portion 11.3. The covering portion 11.3 comprises at least two covering legs 11.4 which are opposite each other in a parallel manner, wherein an empty space which is present between the covering legs 11.4 forms a covering region 11.4.1. The covering portion 11.3 is substantially U-shaped or C-shaped and has the downwardly open covering region 11.4.1, for example, in the form of a receiving tank. The covering portion 11.3 is constructed to cover the transmission unit 8 completely and/or at least partially to receive it. Furthermore, the covering region 11.4.1 is constructed to fix the cover 11 to the transmission unit 8 in a positive-locking and/or non-positive-locking manner. In this case, the covering legs 11.4 form a form which corresponds to a form of the transmission unit 8, in particular a form of a portion of the transmission unit 8 projecting from the upper rail 4. For example, the covering region 11.4.1 is pushed laterally onto the transmission unit 8 and locked thereto. For example, the covering region 11.4.1 has locking elements 11.5 which fix the covering portion 11.3 to the transmission unit 8 in a transverse direction. The covering legs 11.4 are connected to each other at one end via a covering web 11.6. For example, the locking elements 11.5 are arranged in the region of the covering web 11.6.

The covering portion 11.3 comprises two covering wings 11.4.2, for example, covering straps or covering flaps. The covering legs 11.4 have covering wings 11.4.2 which project perpendicularly and in a longitudinal direction therefrom, wherein the covering wings 11.4.2 are constructed to cover the fixing apparatus 10, in particular the connection elements 10.1 and/or the connection regions VB, of the transmission unit 8. The covering wings 11.4.2 are substantially L-shaped or J-shaped. The covering legs 11.4 form the downwardly open covering region 11.4.1. By the covering wings 11.4.2, the connections which are arranged on the upper side 4.1 of the upper rail 5 can additionally be covered in a simple manner. An integration of the cover of the connection elements 10.1 in the transverse carrier 5 is thereby provided. The ends 5.3, 5.4 of the transverse carrier 5, in particular of the carrier member 5.2 for connection to the respective rail pair P1, P2, are therefore constructed as integrated covers 11, in particular as covering elements 11.1.

The covering wings 11.4.2 form covering part-regions 11.4.1a which are arranged laterally relative to the central covering region 11.4.1, that is to say, at the side, and which cover at least the connection regions VB of the holder 10.2 on the upper rail 4. The respective covering part-region 11.4.1a covers the connection element 10.1 of the holder 10.2 on the upper rail 4. In this case, the covering wings 11.4.2 project from the covering legs 11.4 in such a manner that the through-openings 4.2, 4.3 are completely covered and consequently the inner space I located below is protected from external influences.

The transmission unit 8, in particular the transmission housing 8.1, is received in the covering region 11.4.1 in a positive-locking and/or non-positive-locking manner. In particular, the covering legs 11.4 have bulbous portions 11.4.3 which project inwardly into the covering region 11.4.1, in particular into the covering region 11.4.1 and the receiving region, of the transmission unit 8. The bulbous portions 11.4.3 press in a longitudinal direction against the transmission unit 8, in particular against the portion projecting from the upper rail 4 for positive-locking and/or non-positive-locking connection in a longitudinal direction.

The covering legs 11.4 and the covering wings 11.4.2 are preferably in one piece. For example, the covering portion 11.3 and the transverse carrier connection portion 11.2 are in one piece. The cover 11 is, for example, made from metal and/or plastics material. Preferably, the cover 11 is an injection-molded part.

LIST OF REFERENCE NUMERALS

1 Vehicle seat
1.1 Seat face
1.2 Backrest
2 Longitudinal seat adjuster
3 Lower rail
4 Upper rail
4.1 Upper side
4.2, 4.3 Through-opening
5 Transverse carrier
5.1 Receiving member
5.2 Carrier member
5.3, 5.4 End (of the transverse carrier 5)
6 Drive unit
7 Drive shaft
8 Transmission unit
8.1 Transmission housing
8.1.1 Housing portion
8.2 Transmission mechanism
9 Threaded spindle
10 Fixing apparatus
10.1 Connection element
10.2 Holder
10.3 Retention leg
10.4 Retention web
11 Cover
11.1 Covering element
11.2 Transverse carrier connection portion
11.3 Covering portion
11.4 Covering leg
11.4.1 Covering region
11.4.1a Covering part-region
11.4.2 Covering wing
11.4.3 Bulbous portion
11.5 Locking element
11.6 Covering web
I Inner space
P1, P2 Rail pair
SP1, SP2 Position
VB Connection region
W Adjustment path
x Longitudinal axis
y Transverse axis
z Vertical axis

What is claimed is:

1. A longitudinal seat adjuster for a vehicle seat, comprising:
   one rail pair having a lower rail and an upper rail which is displaceably supported on the lower rail,
   a drive unit,
   a transmission unit having a transmission housing, wherein the transmission unit and the drive unit are coupled to each other,
   a holder for fixing the transmission housing to the upper rail, and
   a covering element,
   wherein the upper rail has at least one through-opening, through which at least one housing portion of the transmission housing projects and the covering element comprises at least one covering region which is formed by two covering legs which are opposite each other in a parallel manner, and the covering element comprises one covering part-region which is laterally arranged with respect to the covering region, wherein the covering part-region is defined by a covering wing which projects perpendicularly in a longitudinal direction from one of the covering legs, wherein the covering region is connected to the housing portion in a positive-locking and/or non-positive locking manner and the covering part-region covers at least one connection region of the holder above the upper rail by the covering wing,
   wherein the covering element is connected to a transverse carrier for retaining the drive unit on the rail pair,
   wherein the covering element and the transverse carrier are constructed in one piece.

2. The longitudinal seat adjuster as claimed in claim 1, wherein the covering wing is arranged on the covering region in such a manner that the covering wing is arranged with spacing from the upper side of the upper rail when the covering element is in the state mounted on the transmission unit.

3. The longitudinal seat adjuster as claimed in claim 1, wherein the covering part-region is formed under the covering wing.

4. The longitudinal seat adjuster as claimed in claim 1, wherein the covering wing is substantially L-shaped or J-shaped.

5. The longitudinal seat adjuster as claimed in claim 1, wherein the covering element comprises at least one covering web and the two covering legs which project from the covering web and which are opposite each other in a parallel manner, wherein an empty space which is present between the covering legs comprises the at least one covering region.

6. The longitudinal seat adjuster as claimed in claim 1, wherein the covering region has at least one form corresponding to a form of the housing portion of the transmission housing.

7. The longitudinal seat adjuster as claimed in claim 1, wherein the covering element is substantially omega-shaped.

8. The longitudinal seat adjuster as claimed in claim 1, wherein the holder is arranged with the transmission housing in an inner space which is formed by the rail pair and is fixed to the upper rail.

9. The longitudinal seat adjuster as claimed in claim 1, wherein the holder comprises at least one connection element which projects through a through-opening which is formed in the upper rail and which fixes the holder to the upper rail.

10. The longitudinal seat adjuster as claimed in claim 1, wherein the respective covering leg comprises at least one bulbous portion which is directed inwardly into the covering region for positive-locking and/or non-positive-locking connection to the housing portion.

11. The longitudinal seat adjuster as claimed in claim 10, wherein the housing portion has a recess corresponding to the respective bulbous portion.

12. A motor vehicle seat, having a longitudinal seat adjuster as claimed in claim 1.

13. A longitudinal seat adjuster for a vehicle seat, comprising:
   one rail pair having a lower rail and an upper rail which is displaceably supported on the lower rail,
   a drive unit,
   a transmission unit having a transmission housing, wherein the transmission unit and the drive unit are coupled to each other,
   a holder for fixing the transmission housing to the upper rail, and
   a covering element,
   wherein the upper rail has at least one through-opening, through which at least one housing portion of the transmission housing projects and the covering element comprises at least one covering region which is formed by two covering legs which are opposite each other in a parallel manner, and the covering element comprises one covering part-region which is laterally arranged with respect to the covering region, wherein the covering part-region is defined by a covering wing which projects perpendicularly in a longitudinal direction from one of the covering legs, wherein the covering region is connected to the housing portion in a positive-locking and/or non-positive locking manner and the covering part-region covers at least one connection region of the holder above the upper rail by the covering wind,
   wherein the covering wing is arranged on the covering region in such a manner that the covering wing is arranged with spacing from the upper side of the upper rail when the covering element is in the state mounted on the transmission unit.

14. A longitudinal seat adjust for a vehicle seat, comprising:
   one rail pair having a lower rail and an upper rail which is displaceably supported on the lower rail,
   a drive unit,
   a transmission unit having a transmission housing, wherein the transmission unit and the drive unit are coupled to each other,
   a holder for fixing the transmission housing to the upper rail, and
   a covering element,
   wherein the upper rail has at least one through-opening, through which at least one housing portion of the transmission housing projects and the covering element comprises at least one covering region which is formed by two covering legs which are opposite each other in a parallel manner, and the covering element comprises one covering part-region which is laterally arranged with respect to the covering region,
   wherein the covering part-region is defined by a covering wing which projects perpendicularly in a longitudinal direction from one of the covering legs, wherein the covering region is connected to the housing portion in a positive-locking and/or non-positive locking manner and the covering part-region covers at least one connection region of the holder above the upper rail by the covering wing, wherein the respective covering leg comprises at least one bulbous portion which is directed inwardly into the covering region for positive-locking and/or non-positive-locking connection to the housing portion.

* * * * *